US008657927B2

(12) United States Patent
Rockwell et al.

(10) Patent No.: US 8,657,927 B2
(45) Date of Patent: Feb. 25, 2014

(54) FILTRATION DEVICE FOR USE WITH A FUEL VAPOR RECOVERY SYSTEM

(75) Inventors: James Rockwell, Bellville, OH (US); Paul Jamieson, Mansfield, OH (US); Eric Matson, Bellville, OH (US)

(73) Assignee: Stoneridge, Inc., Warren, OH (US)

( * ) Notice: Subject to any disclaimer, the term of this patent is extended or adjusted under 35 U.S.C. 154(b) by 802 days.

(21) Appl. No.: 12/741,463

(22) PCT Filed: Dec. 14, 2006

(86) PCT No.: PCT/US2006/062103

§ 371 (c)(1), (2), (4) Date: Mar. 3, 2011

(87) PCT Pub. No.: WO2007/087102

PCT Pub. Date: Aug. 2, 2007

(65) Prior Publication Data

US 2011/0203457 A1 Aug. 25, 2011

Related U.S. Application Data

(60) Provisional application No. 60/750,425, filed on Dec. 14, 2005.

(51) Int. Cl.
*B01D 45/00* (2006.01)

(52) U.S. Cl.
USPC .................. 95/268; 96/135; 96/136; 96/139; 123/198 E; 123/519; 55/320; 55/332; 55/418; 55/498; 55/337; 55/424; 55/426; 55/385.3; 55/442; 55/443; 55/444; 55/445; 55/446

(58) Field of Classification Search
USPC ........... 55/320, 332, 418, 498, 337, 424, 426, 55/385.3, 442, 443, 444, 445, 446, 318, 55/319; 123/198 E, 519; 96/135, 136, 139; 95/268
See application file for complete search history.

(56) References Cited

U.S. PATENT DOCUMENTS

| | | | | |
|---|---|---|---|---|
| 5,912,368 | A | 6/1999 | Satarino et al. | |
| 6,599,350 | B1 | 7/2003 | Rockwell et al. | |
| 8,052,768 | B2 * | 11/2011 | Lin et al. | 55/320 |
| 8,062,397 | B2 * | 11/2011 | Lin et al. | 55/320 |
| 2002/0073668 | A1 | 6/2002 | Tokar et al. | |
| 2005/0160707 | A1 | 7/2005 | Dries | |

OTHER PUBLICATIONS

International Search Report and Written Opinion dated Jan. 9, 2008 issued in related International Patent Application No. PCT/US06/62103.
Office Action dated Nov. 6, 2009 issued in related Chinese Patent Application No. 200680052373.7.
Notice of Preliminary Rejection issued Apr. 12, 2013 in corresponding South Korean Patent Application Serial No. 10-2008-7016861.

* cited by examiner

*Primary Examiner* — Dung H Bui
(74) *Attorney, Agent, or Firm* — Grossman, Tucker, Perreault & Pfleger, PLLC

(57) ABSTRACT

A filtration device 8 for filtering air used with a fuel vapor recovery system 100 may comprise a housing comprising an upper end 10 having at least one air inlet 18 and a lower end 12 having at least one air outlet 26, a first passageway 32 in fluid communication with the air inlet 18 and configured to increase the velocity of the air through the first passageway 32 compared to the air inlet 18, a collection cavity 34 in fluid communication the first passageway 32 and configured to reduce the velocity and abruptly change the direction of the air through the collection cavity 34 compared to the first passageway 32, a filter cavity 14 in fluid communication with the collection cavity 34 comprising a filtering media 16, and a clean air cavity 40 in fluid communication with the filter cavity 14 and the air outlet 26 of the housing.

18 Claims, 7 Drawing Sheets

FILTRATION DEVICE FOR USE WITH A FUEL VAPOR RECOVERY SYSTEM

CROSS-REFERENCE TO RELATED APPLICATIONS

This application claims the benefit of U.S. Provisional Application Ser. No. 60/750,425 filed Dec. 14, 2005, the teachings of which are incorporated herein by reference.

FIELD

The present invention generally pertains to filter systems for evaporative emissions systems.

BACKGROUND

Conventional motor vehicles, due to increased emission standards, typically include a fuel vapor recovery system. The fuel vapor recovery system includes a vapor or purge canister for receiving fuel vapors generated in the fuel tank. A fuel vapor absorbent, typically activated charcoal, located in the vapor canister retains the fuel vapor when the vapors are displaced from the fuel tank during refilling. During operation of the engine, the fuel vapor contained in the vapor canister is purged by drawing fresh air through the canister and into the intake manifold of the engine.

Some fuel vapor recovery systems include a filtration device to filter the fresh air introduced into the canister during the purge operation. One variety of filters used in the past include a foam filter placed in a rectangular box. However, water tends to pass through the foam filter and into the canister which reduces the effectiveness of the absorbent or charcoal. Also, dust or other contaminants build up on the foam filter and clog the filter which further reduces its efficiency.

Accordingly, there exists a need for an improved filtering system and method. It is important to note that the present disclosure is not intended to be limited to a system or method which must satisfy one or more of any stated objects or features of the present disclosure. It is also important to note that the present disclosure is not limited to the preferred, exemplary, or primary embodiment(s) described herein. Modifications and substitutions by one of ordinary skill in the art are considered to be within the scope of the present disclosure, which is not to be limited except by the following claims.

BRIEF DESCRIPTION OF THE DRAWINGS

Features and advantages of the present invention are set forth by description of embodiments consistent therewith, which description should be considered in conjunction with the accompanying drawings, wherein:

FIGS. 2A and 2B are detailed views of respective portions of the embodiment illustrated in FIG. 2;

FIGS. 7A and 7B are detailed views of respective portions of the embodiment illustrated in FIG. 7.

DETAILED DESCRIPTION

Figure 1:
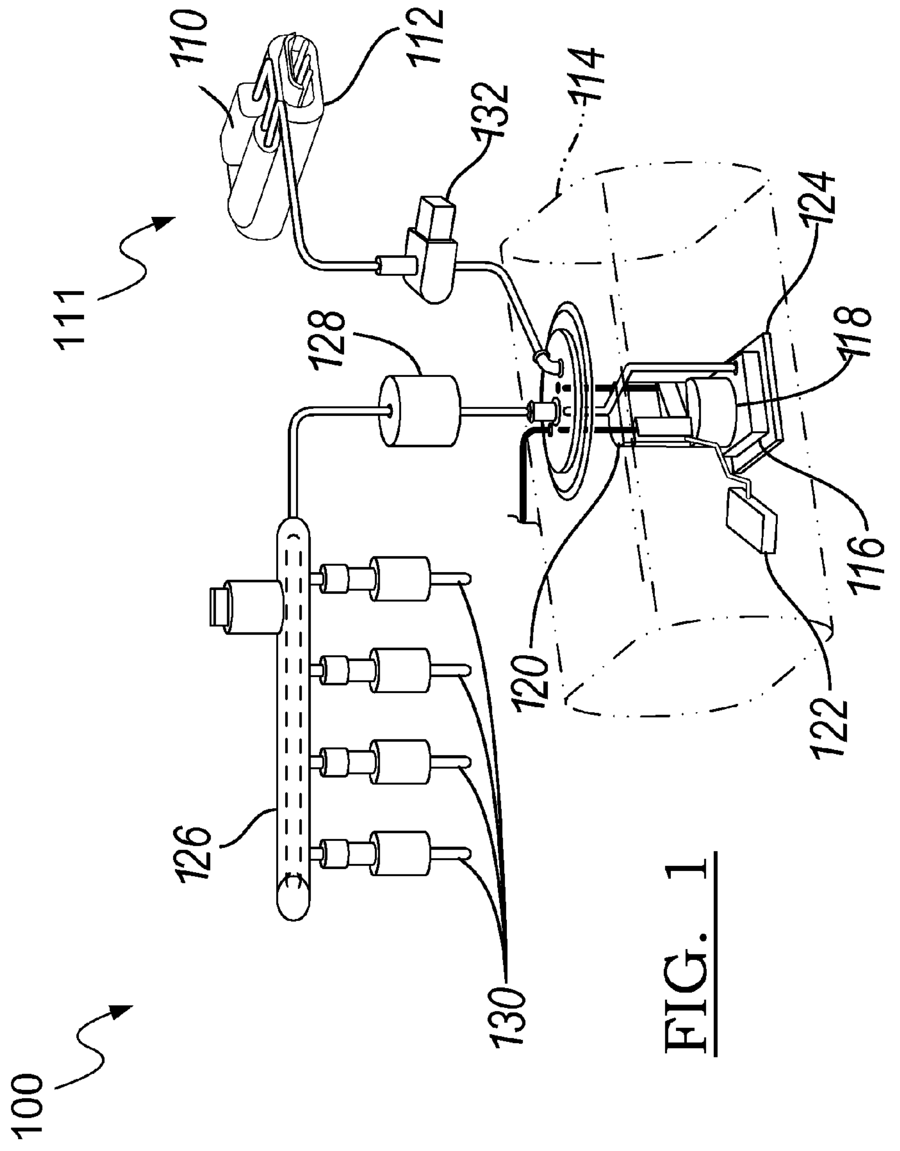
FIG. 1 is a schematic diagram of a fuel system for an internal combustion engine to which the present invention may be applied.

Consistent with the present disclosure, there is provided a filter system for protecting an evaporative emissions system canister from dust and water infiltration. FIG. 1 illustrates one embodiment of a fuel system 100 of an internal combustion engine. The illustrated exemplary fuel system 100 includes a fuel tank 114 containing fuel and fuel delivery devices, which include a fuel pump 116, a brushless motor 118, motor drive electronics 120, a fuel sender 122, a filter 124, an indicator, hydraulic valves, a delivery module cup, pipes and other supplemental devices. Fuel at high-pressure may be sent to a fuel rail 126, located on an engine, through an inline fuel filter 128. Fuel injectors 130 may inject fuel into the air charge entering the engine through an intake manifold (not shown). The fuel vapor, however, may be sent through a fuel tank pressure sensor 132 to a vapor management system 111.

The vapor management system 111 may include a filter system 110 (also called a dust box), which may be connected by fluid passages to a fuel vapor storage canister 112. In one mode of operation, when the fuel tank 114 is being filled, fuel vapor may be transported into the vapor storage canister 112, and clean air, exiting the canister, enters the filter system 110 and escapes into the atmosphere. In another operation mode, the system 111 may allow fresh air to purge the fuel vapor stored in the vapor storage canister 112. During this process, some contaminants may enter the vapor management system 111. The filter system 110 may block the contaminants and allow pure air into the system.

According to one aspect, the filter system 111 may be effectively employed in various different orientations. The filter system 111 may house an evaporative emissions system vent solenoid valve. The filter system 111 may provide a relatively low initial filter restriction and a minimal restriction increase after ingestion of a relatively large quantity of dust or other contaminants. Furthermore, according to one embodiment, the filter system 111 may be capable of attaching directly to an evaporative emissions canister housing 112 by way integral retention clips and a sealed external port. Additionally, the filter system 111 may be provided to withstand under-vehicle environment. In one embodiment, not all of the dust contaminants taken in by the filter system 111 are collected directly onto or in the filtration media. This may allow the filtration system 111 to provide effective filtration in multiple orientations and to provide minimal flow restrictions after ingestion of a relatively large quantity of dust, for example ingestion of approximately 100 grams of dust, while maintaining a relatively small package size, for example having an overall height of about 70 mm or less.

Figure 2:
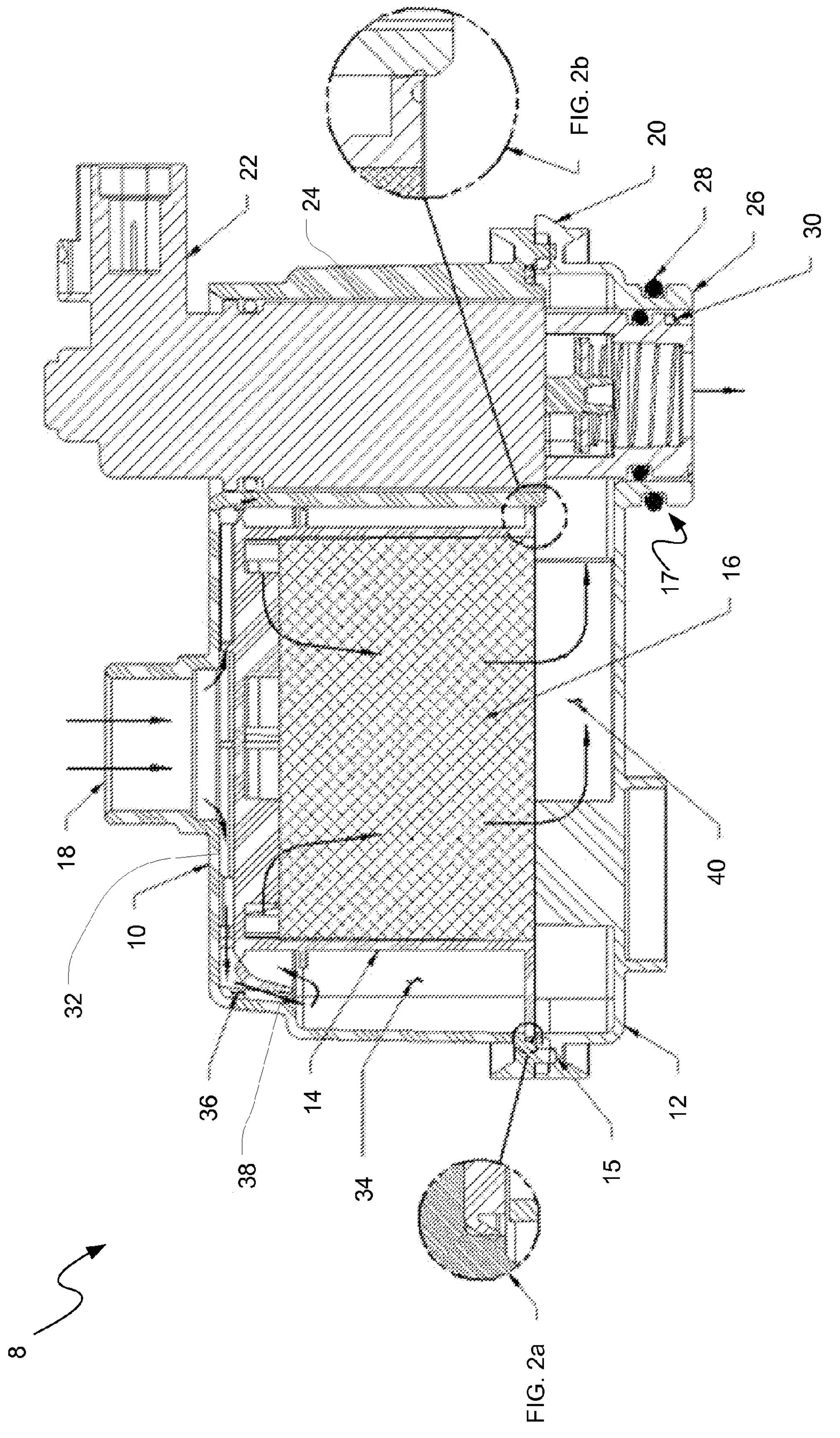
FIG. 2 is a first cross-sectional view of a first embodiment of a filter system consistent with the present disclosure.
Figure 3:
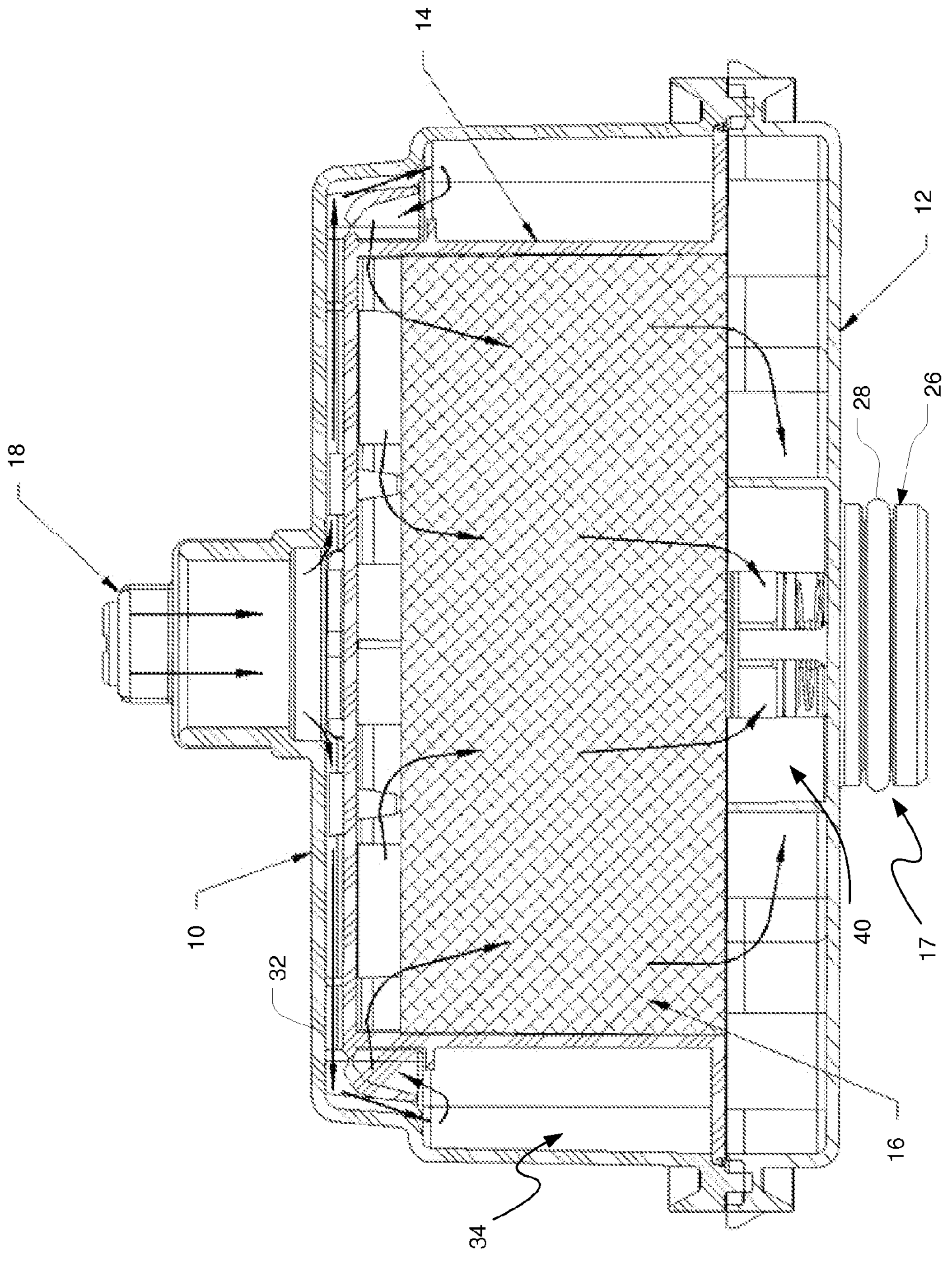
FIG. 3 is a second cross-sectional view of the first embodiment of a filter system consistent with the present disclosure.

Referring to FIGS. 2 and 3, an embodiment of a filter system 8 may generally include filter housing top 10, a filter housing bottom 12, an air deflector/foam support 14, and a filter element or media, such as an open cell foam element 16. The filter housing top 10 may generally include a fresh air inlet port 18 providing an air intake for the filter system 8. As shown, the air inlet port 18 may include an undercut, which may facilitate attachment of a mating tube, e.g., for directing a flow and/or source of air to the filter system 8. Additionally, the air inlet port 18 may provide a smooth interior surface which may facilitate sealing to an o-ring.

The interior of the filter housing top 10 may include tapered pins, which may include an undercut. The tapered pins may be configured to be inserted into mating holes in the air deflector/foam support 14 and retain the air deflector/foam support 14 in position before final assembly, which may include, for example, welding or bonding the filter housing top 10 and the filter housing bottom 12.

The filter housing top 10 may additionally include one or more features to allow attachment of the filter system 8 to an EVAP canister. For example, the filter housing top 10 may include integral retention clips 20 disposed continuously or intermittently around the perimeter of the filter system 8.

As shown, a canister vent valve 22 (FIG. 2) may be coupled to the filter system 8. The canister vent valve 22 may include, for example, a solenoid valve or the like. For example, the filter housing top 10 may include a support tube 24 which may at least partially receive the canister vent valve 22, and provide a smooth internal diameter for supporting and sealing the canister vent valve 22.

As mentioned above, the filter housing top 10 may be coupled to filter housing bottom 12, e.g., by welding, such as vibration welding, bonding, etc. along vibration weld joint 15. As shown in the detail view FIG. 2A, according to one embodiment, a weld joint 15 between the filter housing top 10 and the filter housing bottom 12 may include a wall that may close on the air deflector/foam support 14 flange to provide a perimeter lip seal and trap the seal in place at least partially between the filter housing top 10 and filter housing bottom 12 to maintain the integrity through the life of the filter system 8. In such an embodiment, it may not be necessary to weld or bond the air deflector/foam support to either housing in order to seal the collection cavity.

The filter housing bottom 12 may include an outlet port 26 for connection to an EVAP canister (not shown). As shown, the port 26 may be configured as a exterior port and may include a land 17 for an o-ring 28, which may facilitate sealing to the EVAP canister. In one embodiment, the interior of the filter outlet port 26 may provide support and sealing for the canister vent valve 22. Additionally the outlet port 26 and/or the filter housing bottom 12 may provide one or more retention features 30 to facilitate securing the canister vent valve 22 in position.

The air deflector/foam support 14 may be configured to cooperate with an interior wall of the filter housing top 10 to provide a flow channel 32. The flow channel 32 may deflect air through the gap between the air deflection/foam support 14 and the filter housing top 10 to a dust collection cavity 34, which may be disposed around at least a portion of the inside perimeter of the filter system 8. In other embodiments, the dust collection cavity 34 may be disposed in the interior of the filter system, i.e., the dust collection cavity may be located other than around the inside perimeter of the filter system.

According to one embodiment, the flow channel 32 may be maintained around radius of the corner of the filter housing top 10 by providing an outwardly extending flexible wall 36 around the top of the air deflector/foam support 14. The flexible wall 36 may be forced into the functional position at assembly by means of interfering with the inside wall of the filter housing top 10. The flexible wall 36 may be deflected downwardly such that the flow channel 32 is defined by the flexible wall 36 and the inside wall of the filter housing top 10. In one embodiment, the flow channel 32 may be maintained, and/or a dimension of the flow channel may be influenced by one or more flow channel ribs 38, which may be formed as features on the flexible wall 36 and/or on the inside wall of the filter housing top 10.

In a further embodiment, rather than a flexible wall, the flow channel 32 may be defined between the inside wall of the filter housing top 10 and a molded wall of the air deflector/foam support. That is, the geometry of the wall extending from the upper portion of the air deflector/foam support 14 may be determined by molding rather than by an interference and/or deflection of the flexible wall 36 as a result of interference with the filter housing top 10.

The air deflector/foam support 14 may include one or more holes, e.g., in a region below the flexible wall 36, to permit the flow of air from the dust collection cavity 34 into the interior of the air deflector/foam support 14. Additionally, the air deflector/foam support 14 may include holes that may at least partially receive the tapered posts of the filter housing top during assembly of the filter system 8.

As shown in the detail view of FIG. 2A, the perimeter of the air deflector/foam support flange may have a flexible lip seal that may be deformed during assembly to provide a positive seal between the air deflector/foam support 14 and the filter housing top 10 and/or the filter housing bottom 12. The seal may act to separate the dust collection cavity from the clean air cavity 40. A similar feature, shown in the other detailed view, FIG. 2B, may be provided between the air deflector/foam support 14 and the canister vent valve support 24.

The air deflector/foam support 14 may also protect the perimeter of the filter element 16. For example, the air deflector/foam support 14 may prevent damage to the perimeter of the filter element 16 and/or may control the flow of air though the filter element 16. In such an embodiment, airflow through the filter element 16 may only be permitted from the top to the bottom of the filter element 16.

The filter element 16, may include an open cell foam element, which may provide additional filtration of the air flowing through the filter system 8. As such the filter element 16 may trap at least a portion of any contaminants remaining in the air flow. In one embodiment, the open cell foam element may include 30 pores per inch, although various other pore sizes may be suitably employed. While the filter element 16 has been shown as a foam filter element, various other filter elements may also be employed. For example, the filter element 16 may include a pleated paper or fabric filter, a mesh or screen filter, a fibrous filter, etc.

The flow of air through the filter system 8 is depicted by the arrows in the figures. Flow through the filter system 8 may be induced by engine vacuum, which may be metered by the system purge valve connected to the EVAP canister, or by other suitable means. The filter outlet port 26 may be connected to the EVAP canister fresh air inlet. As air is drawn into the filter via the inlet port 18, the air flows through the air flow channel 32 defined between the filter housing top 10 and the flexible wall 36 of the air deflector/foam support 14. In the illustrated embodiment, the air flow may generally be toward the perimeter of the filter system 8, although in other embodiments the air flow need not be towards the perimeter.

The airflow channel 32 may narrow as the airflow approaches and enters the dust collection cavity 34. The narrowing of the air flow channel 32 may increase the velocity of the airflow, and therein the velocity of any particles or fluid carried by the airflow. The increase in velocity of the particles or fluid may increase the momentum of such particles or fluid. As the airflow enters the dust collection cavity 34, the increased momentum of the particles and fluid may separate the particle from the airflow as the airflow is redirected, e.g., by the pressure differential, into the interior of the air deflector/foam support 14. The momentum of the particles or fluid may carry the particle or fluid in the initial direction of the airflow, i.e., into the dust collection cavity 34. In some embodiments, this effect may be most significant in larger particles or droplets of fluid, which may have the greatest momentum. A relatively sharp change in direction of the airflow may facilitate separation, but is not necessary. In addition to being separated by momentum, dust particles and fluid may also be collected by gravitational forces acting on the particles or fluid.

The airflow may proceed from the dust collection cavity 34 into the interior of the air deflector/foam support 14. For example, the air deflector/foam support 14 may include one or more openings adjacent to the flexible wall 36. In addition to providing an inlet into the interior of the air deflector/foam support 14, the location of the holes may provide an advantageously sharp direction change of the airflow. The location of the holes may also protect the perimeter of the filter element 16. As such, only the top and bottom of the filter element 16 may be open for air flow. As the air flows through the filter element 16, additional dust and fluid may be captured and removed from the airflow.

After the airflow enters the clean air cavity 40, the clean air flows to the canister vent valve 22. The canister vent valve 22 may control the flow of clean air into the EVAP canister.

FIGS. 4 through 7, 7A and 7B depict alternative embodiments of the filter system 8 herein in which like reference numerals refer to like elements throughout. In each embodiment, the filter system 8 may include a collection cavity 34 in to which particles and fluid may be separated by inertial and/or gravitational force on the particles or fluid. The filter system 8 may further include a filter element 16 which may capture at least a portion of dust or fluid in the airflow and separate at least a portion of the dust or fluid from the airflow. The filter system 8 may also include a canister vent valve 22 for controlling the flow of air into the EVAP canister.

Figure 4:
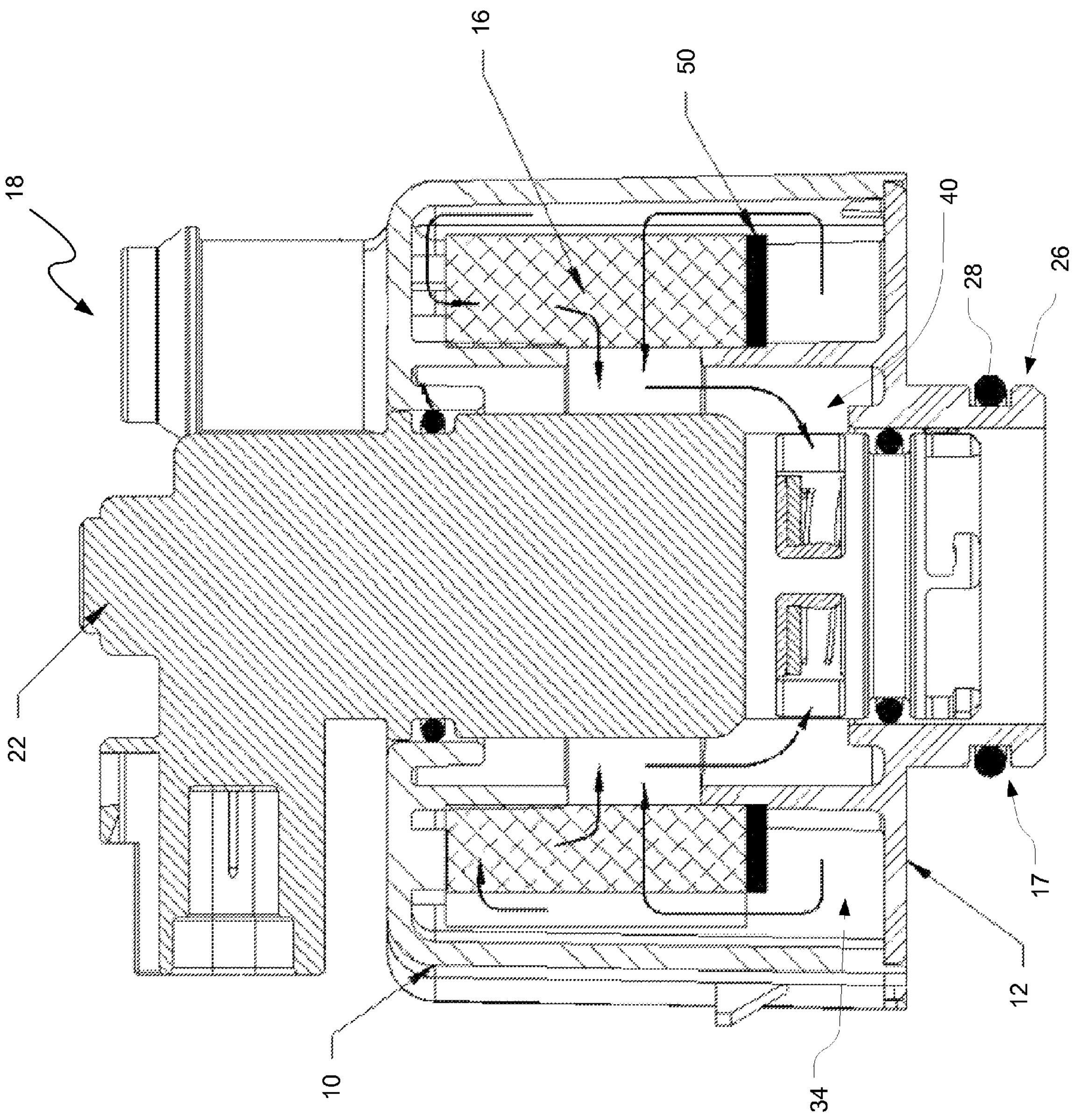
FIG. 4 is a first cross-sectional view of a second embodiment of a filter system consistent with the present disclosure.
Figure 5:
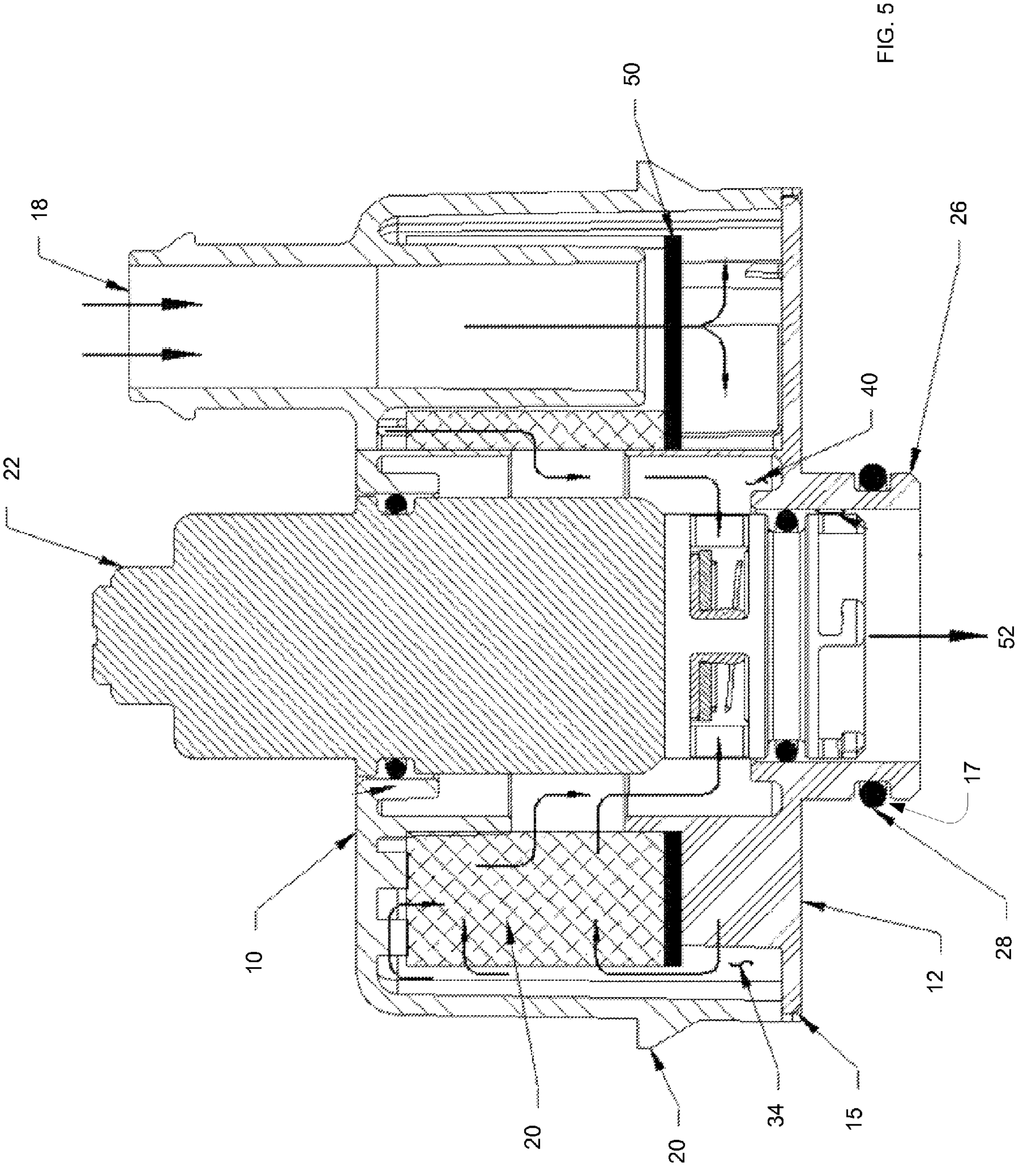
FIG. 5 is a second cross-sectional view of the second embodiment of a filter system consistent with the present disclosure.
Figure 6:
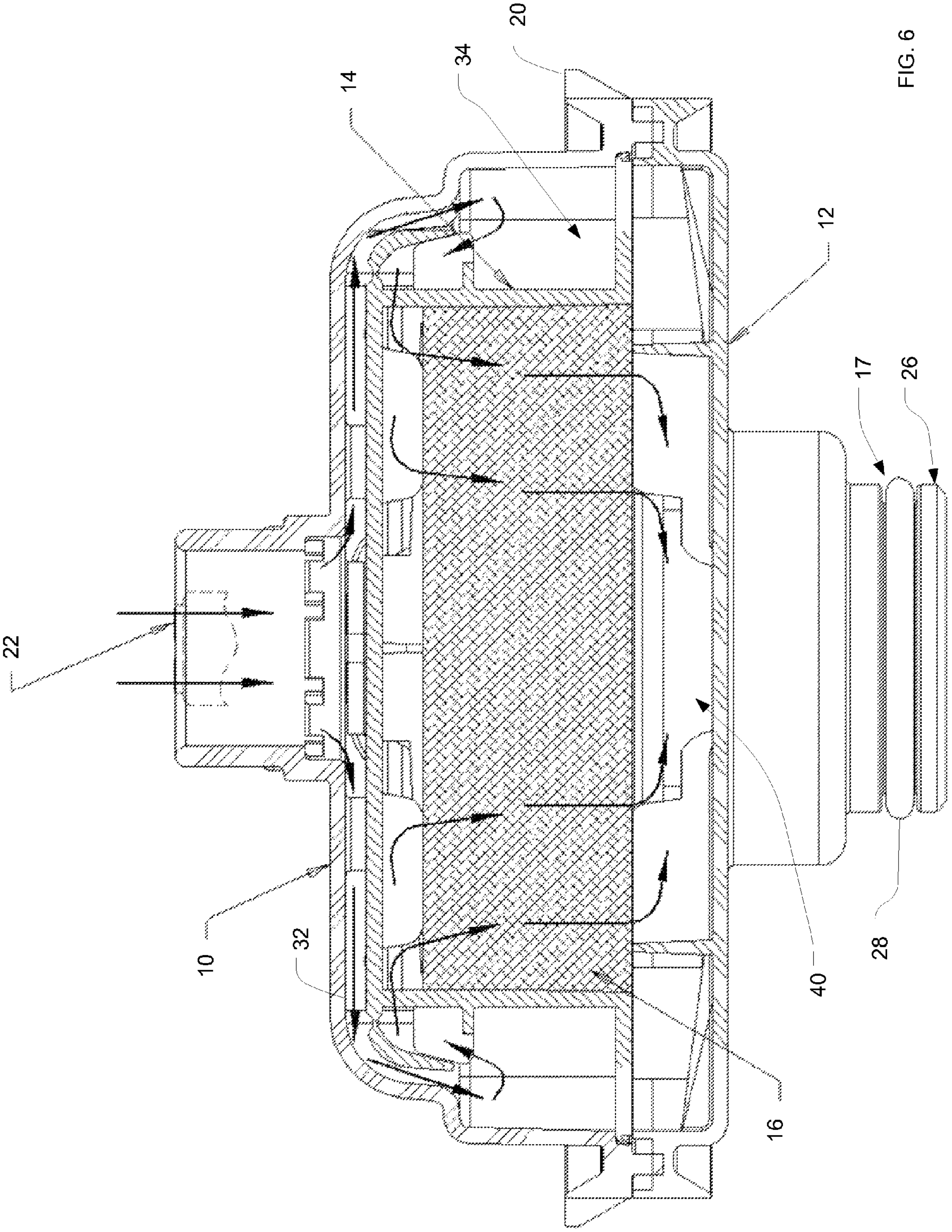
FIG. 6 is a first cross-sectional view of a third embodiment of a filter system consistent with the present disclosure.
Figure 7:
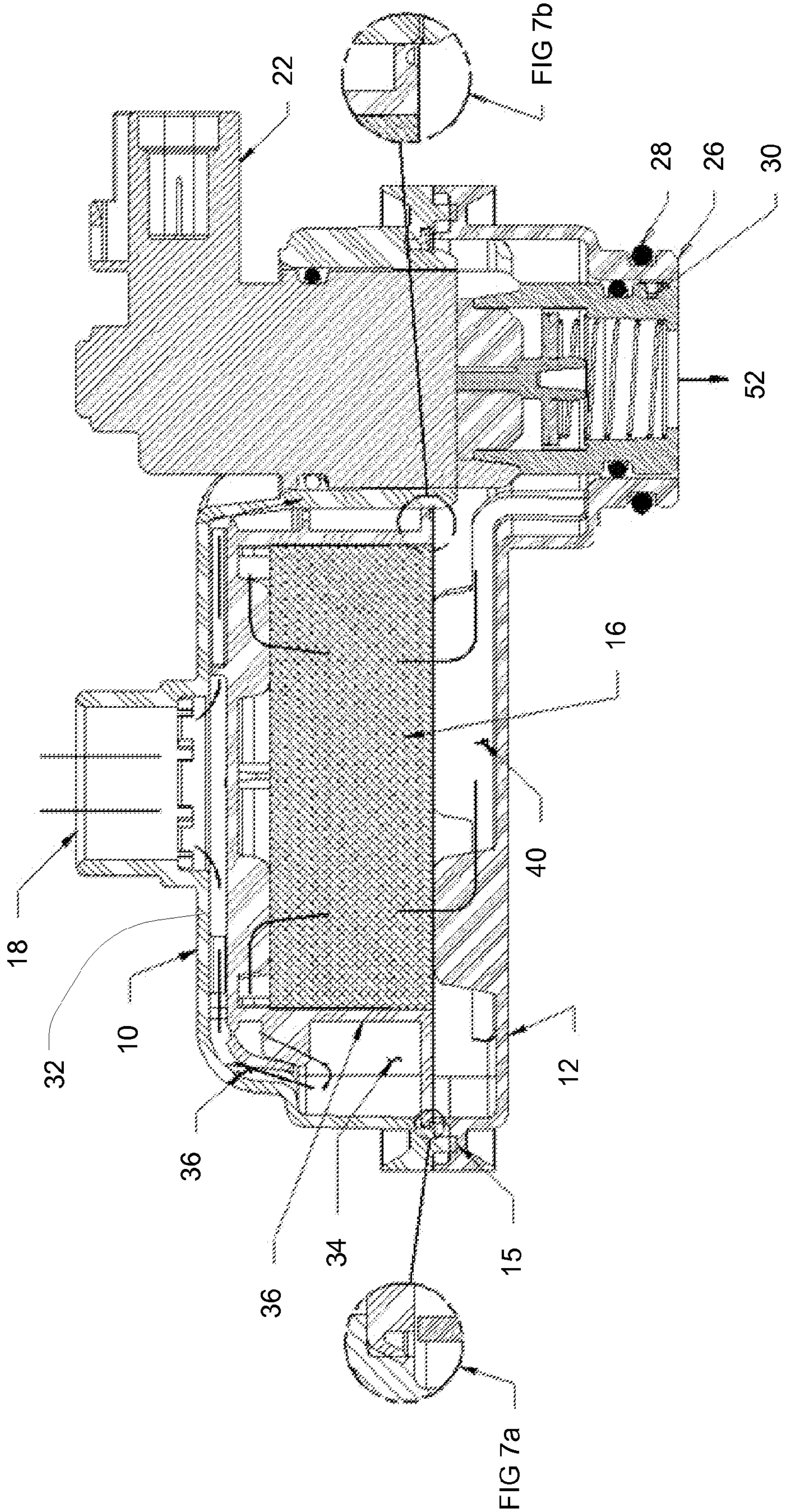
FIG. 7 is a second cross-sectional view of the third embodiment of a filter system consistent with the present disclosure.

As shown in FIGS. 4 and 5, the air deflector may be replaced with a closed cell foam barrier 50. Additionally, the sides of the filter element 16, such as the open cell foam element, may be open and the vacuum source 52 may be proximate the center of the filter element 16.

In addition to the illustrated variations, a filter system 8 consistent with the present disclosure may include a variety of male, female and surface or flanged ports for coupling to an air inlet and to an EVAP canister. Additionally, the canister vent valve 22 may be externally supported relative to the filter system 8, or may include various alternative support and sealing arrangements. Mounting of the filter system 8 to the EVAP canister, or to other structures or systems may be achieved through features other than integral retention clip features, such as though flange, brackets, etc.

A filter system 8 consistent with the present disclosure may, accordingly, provide efficient filtration and dust and/or fluid collection in multiple orientations, e.g., in five perpendicular positions. Filtration and dust and/or fluid collection may include directing the incoming air first to the collection cavity 34 which may provide separation of at least a portion of the dust and/or fluid contaminants from the incoming air. Separation may include inertial and/or gravitational separation. For example, the velocity of the incoming airflow may be increased as the airflow approaches the collection cavity 34 to increase the momentum of the dust or fluid. The direction of the airflow may then be changed, allowing the particles or fluid to continue into the collection cavity 34 as a result of momentum. In one embodiment, the collection cavity 34 may be disposed around at least a portion of a perimeter of a filtration element 16.

In some embodiments the inertial separation of particles or fluid, as provided by the redirection of the airflow at the collection cavity 34, may be 50% efficient in removing ISO Course dust. The separation efficiency provided by the redirection of the airflow may reduce the burden on the filter element 16. Accordingly, a filter system 8 herein may provide improved flow, even after prolonged use, due to the initial separation. Improved filtration may, therefore, be provided by utilizing the two separation operations together. Furthermore, the filter system 8 herein may suitably be employed in multiple orientations. Additionally, the collection cavity 34 may provide a higher particle and fluid holding capacity than a filter element alone. Accordingly, the dust and fluid holding capacity of the filter system 8 may be higher per package volume than may be readily achievable through the use of a filter element alone. According to yet another aspect, the filter system 8 may not require a welding or bonding operation to create a sealed dust collection cavity 34.

Accordingly, the present disclosure features an improved filtering system and method. In one embodiment, the present disclosure features a filtration device for filtering air used with a fuel vapor recovery system. The filtration device may comprise a housing comprising an upper end having a at least one air inlet and a lower end having at least one air outlet. A first passageway may be in fluid communication with the air inlet and configured to increase the velocity of the air through the first passageway compared to the air inlet. A collection cavity may be in fluid communication the first passageway and configured to reduce the velocity and abruptly change the direction of the air through the collection cavity compared to the first passageway. A filter cavity may be in fluid communication with the collection cavity comprise a filtering media. Additionally, a clean air cavity may be in fluid communication with the filter cavity and the air outlet of the housing.

The collection cavity may optionally substantially surround an outer perimeter of the filter cavity. The collection cavity may also remove approximately 50% of the contaminants contained in the air. The filter cavity may be disposed proximate the center of the housing and the filtering media may comprise at least one filtering media selected from the group consisting of foam, pleated media, and screen. The housing may have a maximum height of approximately 70 mm or 40 mm. At least a portion of a wall may optionally define the filtering cavity as well as at least a portion of the collection cavity. The wall may comprise a closed cell foam. The upper end of the housing may further comprise at least one pin ending downwardly towards the lower end of the housing which matingly engages with at least one hole in the filter cavity. The filter cavity may additionally comprise at least one flexible wall disposed between an inlet of the collection cavity and an outlet of the first passageway. A canister vent valve may be disposed within a valve cavity in the housing which is configured to regulate the flow rate of the aid through the air outlet of the housing.

In another embodiment, the present disclosure features a fuel vapor management system comprising a fuel vapor storage canister, a filter system fluidly coupled to the fuel vapor storage canister, and a canister vent valve. The filter system may comprise a housing comprising an upper end having a at least one air inlet fluidly configured to draw atmospheric air and a lower end having at least one air outlet coupled to the fuel vapor storage container. A first passageway may be in fluid communication with the air inlet and configured to increase the velocity of the air through the first passageway compared to the air inlet. A collection cavity may be in fluid communication the first passageway and configured to reduce the velocity and abruptly change the direction of the air through the collection cavity compared to the first passageway. A filter cavity may be in fluid communication with the collection cavity and comprise a filtering media. A clean air cavity may be in fluid communication with the filter cavity and the air outlet of the housing. Additionally, the canister vent valve may be disposed within a valve cavity of the housing and may be configured to regulate the flow rate of the air through the air outlet of the housing.

In yet another embodiment, the present disclosure features a method of filtering comprising drawing incoming air containing contaminants through an air inlet of a filtering system from the atmosphere, increasing the velocity of the incoming air and the contaminants through a first passageway relative to the air inlet, reducing the velocity and changing a direction of flow of the incoming air through a collection cavity fluidly coupled to the first passageway wherein at least a portion of the contaminants in the incoming air are separated from the incoming air and are collected in the collection cavity, and passing the incoming air and the remaining contaminants through a filtering media disposed in a filtering cavity of the filtering system wherein the filtering media separates at least an portion of the remaining contaminants from the incoming air.

As mentioned above, the present disclosure is not intended to be limited to a system or method which must satisfy one or more of any stated or implied object or feature of the disclosure and should not be limited to the preferred, exemplary, or primary embodiment(s) described herein. The foregoing description of a preferred embodiment of the present disclosure has been presented for purposes of illustration and description. It is not intended to be exhaustive or to limit the present disclosure to the precise form disclosed. Obvious modifications or variations are possible in light of the above teachings. The embodiment was chosen and described to provide the best illustration of the principles of the present disclosure and its practical application to thereby enable one of ordinary skill in the art to utilize the present disclosure in various embodiments and with various modifications as is suited to the particular use contemplated. All such modifications and variations are within the scope of the present disclosure as determined by the claims when interpreted in accordance with breadth to which they are fairly, legally and equitably entitled.

What is claimed is:

1. A filtration device for filtering air used with a fuel vapor recovery system, said filtration device comprising:

a housing comprising an upper end having at least one air inlet and a lower end having at least one air outlet;

a support wall positioned within said housing and having a top portion adjacent to said upper end of said housing and a bottom portion adjacent to said lower end of said housing;

a first passageway in fluid communication with said air inlet and configured to increase the velocity of said air through said first passageway compared to said air inlet, said first passageway defined between said top portion of said support wall and a cooperating portion of an interior wall of said upper end of said housing;

a collection cavity in fluid communication said first passageway and configured to reduce the velocity and abruptly change the direction of said air through said collection cavity compared to said first passageway, wherein a portion of said collection cavity is defined by a portion of said support wall;

a filter cavity in fluid communication with said collection cavity, said filter cavity being defined by said support wall and comprising a filtering media, wherein said filter cavity is configured to receive air from an outlet of said collection cavity by way of one or more inlets defined in said top portion of said support wall; and a clean air cavity in fluid communication with said filter cavity and said air outlet of said housing.

2. The filtration device of claim 1 wherein said collection cavity substantially surrounds an outer perimeter of said filter cavity.

3. The filtration device of claim 1 wherein said collection cavity removes approximately 50% of the contaminants contained in said air.

4. The filtration device of claim 1 wherein said filter cavity is disposed proximate the center of said housing.

5. The filtration device of claim 1 wherein said filtering media comprises at least one filtering media selected from the group consisting of foam, pleated media, and screen.

6. The filtration device of claim 5 wherein said filtering media comprises an open cell foam.

7. The filtration device of claim 1 wherein housing has a maximum height of approximately 70 mm.

8. The filtration device of claim 7 wherein housing has a maximum height of approximately 40 mm.

9. The filtration device of claim 1 wherein portion of said support wall comprises closed cell foam.

10. The filtration device of claim 1 wherein said upper end of said housing further comprises at least one pin ending downwardly towards said lower end of said housing, wherein said at least one pin matingly engages with at least one corresponding hole in said support wall of said filter cavity.

11. The filtration device of claim 1 wherein said top portion of said support wall adjacent to said interior wall of said upper end of said housing further comprises at least one outwardly extending flexible wall disposed between an inlet of said collection cavity and an outlet of said first passageway.

12. The filtration device of claim 1 further comprising a canister vent valve disposed within a valve cavity, said canister vent valve configured to regulate the flow rate of said air through said air outlet of said housing.

13. A fuel vapor management system comprising:

a fuel vapor storage canister;

a filter system fluidly coupled to said fuel vapor storage canister, said filter system comprising:

a housing comprising an upper end having at least one air inlet fluidly configured to draw atmospheric air and a lower end having at least one air outlet coupled to said fuel vapor storage container;

a support wall positioned within said housing and having a top portion adjacent to said upper end of said housing and a bottom portion adjacent to said lower end of said housing;

a first passageway in fluid communication with said air inlet and configured to increase the velocity of said air through said first passageway compared to said air inlet, said first passageway defined between said top portion of said support wall and a cooperating portion of an interior wall of said upper end of said housing;

a collection cavity in fluid communication said first passageway and configured to reduce the velocity and abruptly change the direction of said air through said collection cavity compared to said first passageway, wherein a portion of said collection cavity is defined by a portion of said support wall;

a filter cavity in fluid communication with said collection cavity, said filter cavity being defined by said support wall and comprising a filtering media, wherein said filter cavity is configured to receive air from an outlet of said collection cavity by way of one or more inlets defined in said top portion of said support wall;

a clean air cavity in fluid communication with said filter cavity and said air outlet of said housing; and a valve cavity disposed proximate said air outlet of said housing; and a canister vent valve disposed within said valve cavity and configured to regulate the flow rate of said air through said air outlet of said housing.

14. The fuel vapor management system of claim 13 wherein said collection cavity substantially surrounds an outer perimeter of said filter cavity.

15. The fuel vapor management system of claim 13 wherein said filtering media comprises an open cell foam.

16. The fuel vapor management system of claim 13 wherein housing has a maximum height of approximately 70 mm.

17. The fuel vapor management system of claim 13 wherein a portion of said support wall comprises closed cell foam.

18. A method of filtering comprising:

drawing incoming air containing contaminants through an air inlet of a filtering system from the atmosphere, said filtering system comprising:

a housing comprising an upper end having said air inlet and a lower end having at least one air outlet;

a support wall positioned within said housing and having a top portion adjacent to said upper end of said housing and a bottom portion adjacent to said lower end of said housing;

a first passageway in fluid communication with said air inlet and defined between said top portion of said support wall and a cooperating portion of an interior wall of said upper end of said housing;

a collection cavity in fluid communication said first, wherein a portion of said collection cavity is defined by a portion of said support wall; and a filter cavity in fluid communication with said collection cavity, said filter cavity being defined by said support wall and comprising a filtering media;

increasing the velocity of said incoming air and said contaminants through said first passageway relative to said air inlet;

reducing the velocity and changing a direction of flow of said incoming air through said collection cavity fluidly coupled to said first passageway, wherein at least a portion of said contaminants in said incoming air are separated from said incoming air and are collected in said collection cavity; and passing said incoming air and the remaining contaminants from an outlet of said collection cavity and through one or more inlets defined in said top portion of said support wall and through said filtering media disposed in said filtering cavity of said filtering system, wherein said filtering media separates at least a portion of said remaining contaminants from said incoming air.

* * * * *